United States Patent

Tetzlaff et al.

[11] Patent Number: 5,928,345
[45] Date of Patent: *Jul. 27, 1999

[54] FIELD INSTRUMENT WITH DATA BUS COMMUNICATIONS PROTOCOL

[75] Inventors: David E. Tetzlaff, Minnetonka; Jogesh Warrior, Chanhassen; Gabriel A. Maalouf, Minneapolis, all of Minn.

[73] Assignee: Rosemont Inc., Eden Prairie, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,688

[22] Filed: Sep. 30, 1996

[51] Int. Cl.$^6$ ................................................ G06F 13/00
[52] U.S. Cl. .................... 710/107; 710/105; 710/106; 710/110; 710/9; 709/208; 340/825.07
[58] Field of Search ........................ 395/285, 287, 395/829, 857; 709/208; 170/105–107, 110, 9; 340/825.07

[56] References Cited

U.S. PATENT DOCUMENTS

| | | | |
|---|---|---|---|
| 4,360,870 | 11/1982 | McVey | 364/200 |
| 4,564,899 | 1/1986 | Holly et al. | 364/200 |
| 4,661,902 | 4/1987 | Hochsprung et al. | 340/825.5 |
| 4,831,358 | 5/1989 | Ferrio et al. | 340/825.5 |
| 4,872,003 | 10/1989 | Yoshida | 340/825.08 |
| 5,023,778 | 6/1991 | Simon, Jr. et al. | 395/200.39 |
| 5,072,374 | 12/1991 | Sexton et al. | 395/800 |
| 5,150,464 | 9/1992 | Sidhu et al. | 100/34 |
| 5,270,898 | 12/1993 | Elms et al. | 361/96 |
| 5,276,442 | 1/1994 | Cree et al. | 340/825.52 |
| 5,481,456 | 1/1996 | Ogura | 364/424.01 |
| 5,485,400 | 1/1996 | Warrior et al. | 364/550 |
| 5,564,114 | 10/1996 | Popat et al. | 395/285 |
| 5,586,272 | 12/1996 | Gardmer | 395/285 |
| 5,603,086 | 2/1997 | Cree et al. | 340/825.52 |
| 5,630,152 | 5/1997 | DeLuca et al. | 712/1 |
| 5,764,928 | 6/1998 | Lanctot | 710/105 |

FOREIGN PATENT DOCUMENTS

| | | |
|---|---|---|
| 0 246 666 B1 | 5/1994 | European Pat. Off. . |
| 0 383 827 B1 | 2/1995 | European Pat. Off. . |
| 0 237 839 B1 | 8/1996 | European Pat. Off. . |

OTHER PUBLICATIONS

Dipl.–Ing. Viktor Wolf, "Datenakquisition mit dem SPI–Bus", Elektronik, vol. 36, Jun. 26, 1987, No. 13, pp. 96–100.
Motorola M68HC11 Reference Manual, 1991.

*Primary Examiner*—Ayaz R. Sheikh
*Assistant Examiner*—Xuan M. Thai
*Attorney, Agent, or Firm*—Westman, Champlin & Kelly, P.A.

[57] ABSTRACT

The present invention includes a process control instrument having an improved data bus protocol for facilitating communications between master and slave nodes. The process control instrument includes a microprocessor operating in accordance with the SPI data bus protocol, first and second peripheral devices, and a data bus coupled to the microprocessor and the first and second peripheral devices. The improved data bus protocol used in the process control instruments of the present invention provides numerous advantages such as reduced printed circuit board space requirements and greater interchangeability of peripheral and master node components.

17 Claims, 3 Drawing Sheets

FIELD INSTRUMENT WITH DATA BUS COMMUNICATIONS PROTOCOL

BACKGROUND OF THE INVENTION

The present invention relates generally to the field of process control instruments. More particularly, the present invention relates to a new data bus system and protocol for communication between master control nodes and peripheral devices in process control field instrument operating in accordance with the standard Motorola™ SPI protocol.

Process control instruments such as transmitters and controllers are used to monitor and/or control industrial processes. In some recent designs, these process control instruments include a number of internal devices or components such as a microprocessor which functions as a master node and a number of peripheral electronic devices which act as slave nodes. The peripheral electronic devices include, for example, pressure sensors for measuring process pressures, temperature sensors for measuring process temperatures, valves for controlling a process, digital-to-analog and analog-to-digital converters for converting data transferred between analog and digital devices, communication links for transmitting and receiving information over a two-wire process control loop, memory devices for storing instructions or monitored process results, and displays for providing a graphical representation of some process related information. Typically, all of these devices are internal to the instrument or in close proximity to the instrument. The instrument can include any combination of the above mentioned slave nodes (i.e., peripheral devices). The various slave nodes in the process control instrument communicate on a data bus which connects each of the peripheral devices to the master node.

Frequently, the master node in a process control instrument is a Motorola or compatible microprocessor or microcontroller. For example, the Motorola 68HC05 and 68HC11 microcontrollers are commonly used as the master node in process control instruments. These and other microcontrollers are designed to operate in accordance with the standard Serial Peripheral Interface (SPI) bus communication protocol which is defined by Motorola in the M68HC11 Reference Manual which is hereby incorporated by reference. While use of microprocessors or microcontrollers which operate in accordance with the SPI protocol is in many circumstances advantageous, the SPI protocol itself introduces a number of disadvantageous data bus requirements and has a number of shortcomings. For example, in process control instruments, the size of the devices can be critical. Therefore, smaller printed circuit boards (PCB's) are preferred for inside the process control instrument. However, with the SPI protocol, a separate chip select (CS) data bus line is required for each peripheral device which is to be connected to the master node. In addition to requiring more PCB space for the additional CS bus lines, this requirement of the standard SPI protocol also requires additional pins on the master node chip. Another disadvantage of the SPI protocol relates to the difficulties of adding or changing the master node or slave nodes. Typically, each device which communicates on the process control instrument data bus has a predetermined address. Adding, removing or interchanging nodes requires that the bus and/or addressing be customized to accommodate the change.

As illustrated above, it is apparent that the SPI protocol provides a number of disadvantages, particularly in data buses within process control instruments. The present invention overcomes these and other disadvantages of the standard SPI communications protocol.

SUMMARY OF THE INVENTION

The present invention is a process control instrument having an improved data bus protocol for facilitating communications between internal master nodes or microprocessors and internal slave nodes or peripheral devices. The process control instrument includes at least one microprocessor operating in accordance with the standard SPI data bus protocol, first and second peripheral devices, and a data bus coupled to the microprocessor and the first and second peripheral devices. The improved data bus protocol used in the process control instruments of the present invention provides numerous advantages such as reduced printed circuit board space requirements and greater interchangeability of peripheral and master node components.

In some embodiments of the process control instrument of the present invention, the improved data bus protocol has a single chip select (CS) data bus line which is coupled to the CS connections on each of the master and slave nodes. In other embodiments, the CS lines are eliminated altogether. In other embodiments, the process control instrument has a data bus with a bi-directional master-in-slave-out (MISO) line adapted to facilitate serial communications both from the peripheral devices to the microprocessor, and between the peripheral devices. In still other embodiments of the process control instrument of the present invention, the data bus physical interconnection and protocol are adapted such that the peripheral devices can be dynamically assigned addresses for communication on the data bus.

DETAILED DESCRIPTION OF THE PREFERRED EMBODIMENTS

The present invention includes an improved internal data bus communication protocol for process control instruments based on the Motorola™ Serial Peripheral Interface (SPI). The invention may be used for communication between devices or components which are connected on a data bus of the instrument. Typically, the data bus is internal to the instrument. The conventional or standard SPI protocol supports a master node and plural slave nodes for synchronous bi-directional serial communications. Standard SPI protocol requires a separate chip select (CS) data bus line for each slave node. The data bus protocol used in process control instruments of the present invention enhances the standard SPI protocol by allowing a single CS line to control multiple slave nodes, by providing an access arbitration mechanism to enable multiple slave nodes to access the data bus on their own initiative, and by adding peer-to-peer and broadcast capabilities.

Figure 1:
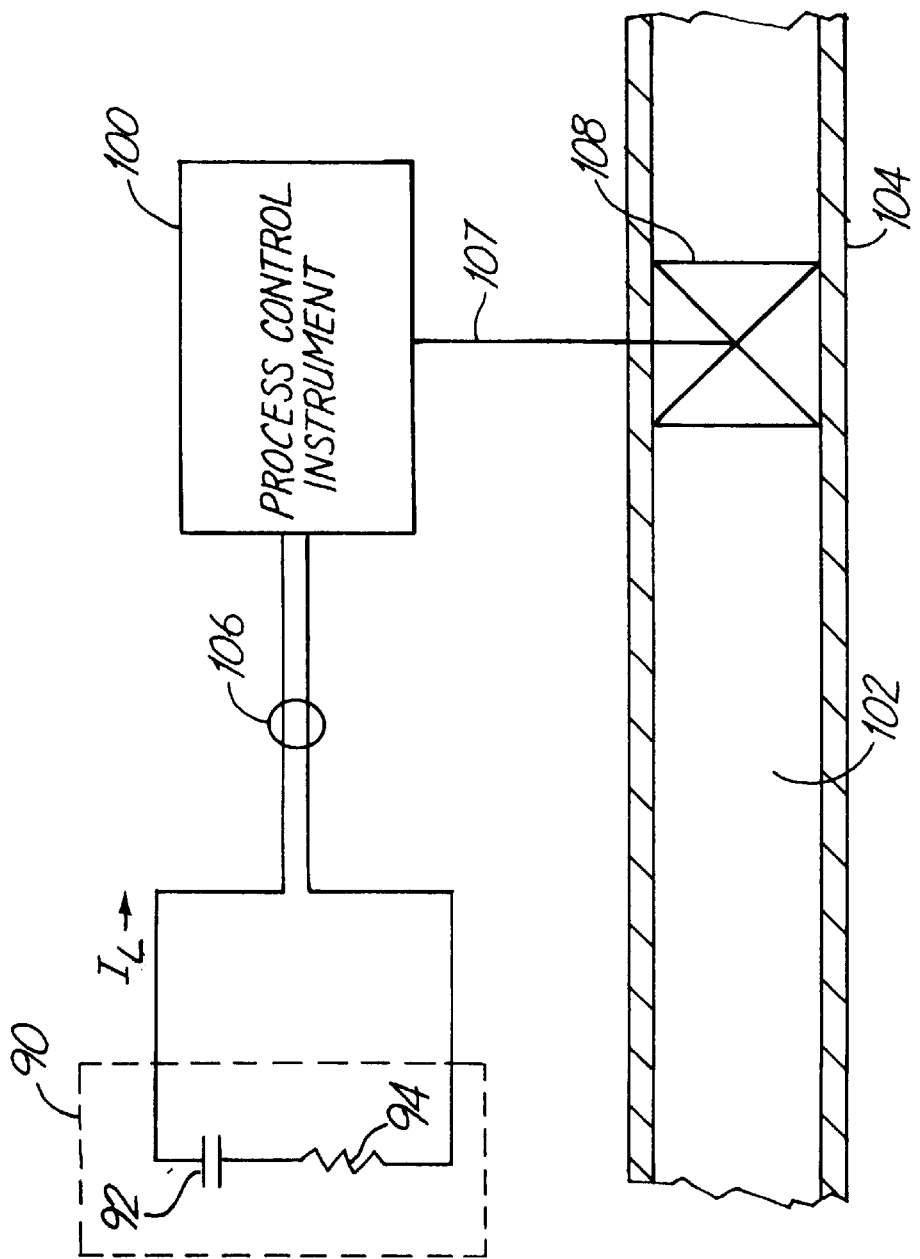
FIG. 1 is a diagrammatic view of a portion of a process control system having a process control instrument according to the present invention, a process pipeline, and a remote device for monitoring or controlling a process.

FIG. 1 is a diagrammatic illustration of a portion of a process control system having a control room 90 coupled to a process control instrument 100 controlling or monitoring a process. Control room 90 is modeled as a voltage source 92 in series with resistance 94. In the industrial process application illustrated, a fluid 102 flows through a pipeline 104. Process control instrument 100, which communicates with other process control instruments or with a master control unit via two-wire process control loop or circuit 106 carrying loop current $I_L$, monitors or controls remote device 108 (such as a motor or switch) via a connection 107 in order to monitor or control the process. For example, remote device 108 can include a valve, while process control instrument 100 includes a valve positioner as a peripheral device. In the alternative, remote device 108 can include a pressure sensor, a temperature sensor or any of a wide variety of other remote devices known in the art used in the process control environment. Frequently, multiple process control instruments 100 are coupled to two-wire control loop 106 for controlling or monitoring various aspects of the process.

Figure 2:
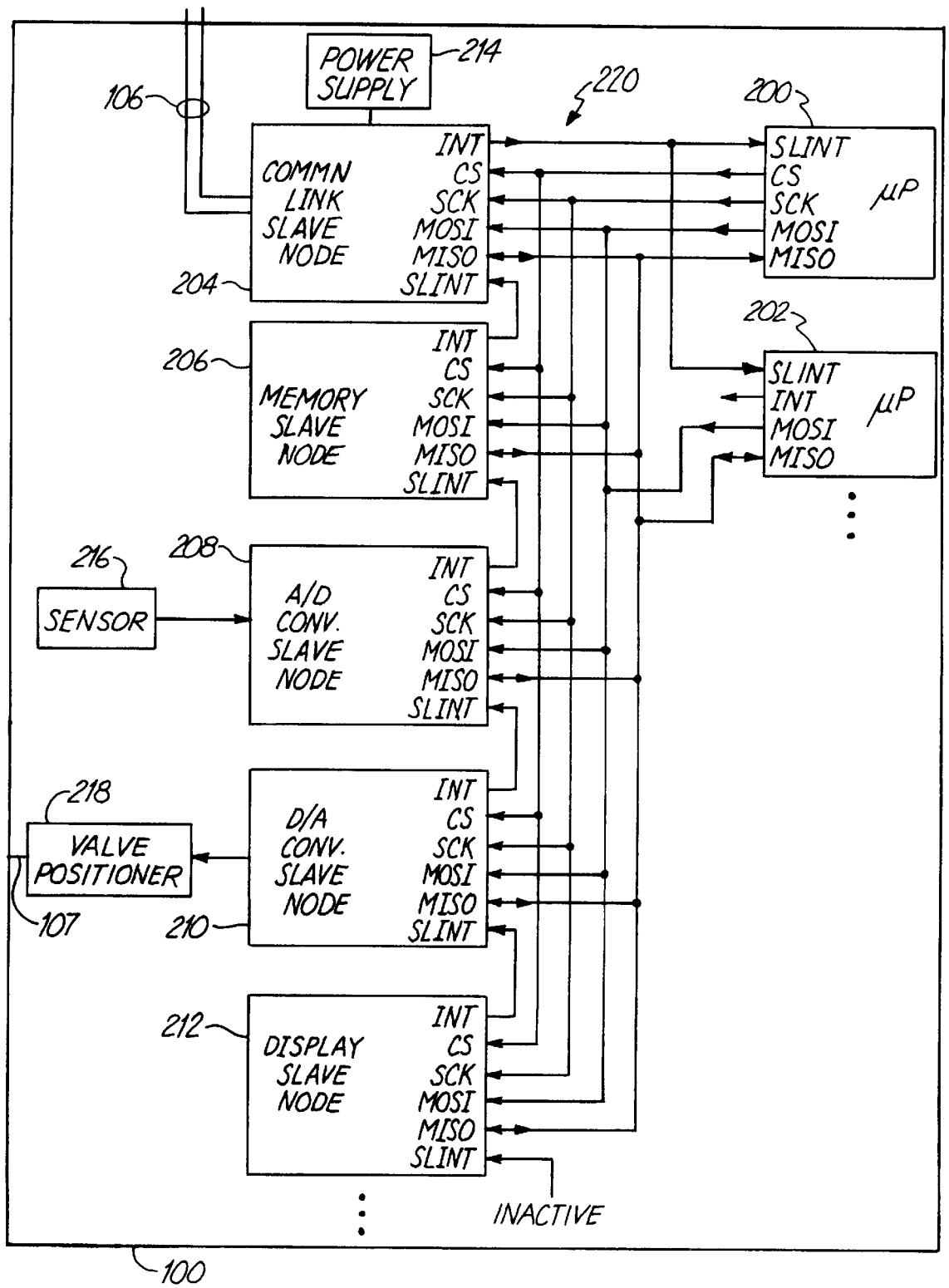
FIG. 2 is a block diagram of a preferred embodiment of the process control instrument of the present invention including master nodes operating in accordance with the SPI protocol, peripheral device slave nodes, and a data bus coupling together the master and slave nodes.

FIG. 2 is a block diagram of process control instrument showing various devices connected on a data bus 100 in accordance with preferred embodiments of the present invention. As illustrated, process control instrument 100 includes first microprocessor 200 and second microprocessor 202. While process control instrument 100 is illustrated as having two microprocessors, it can in other embodiments have more or less than two microprocessors. Microprocessors 200 and 202 are preferably Motorola or compatible microprocessors or controllers of the type available in the commercial market which are designed or adapted for use with the standard SPI protocol. Typically, one of microprocessors 200 and 202 act as the system master node. The other typically acts as a peripheral device or slave node.

Process control instrument 100 also includes one or more of slave nodes or peripheral devices 204, 206, 208, 210 and 212. The slave nodes of process control instrument 100 are typically peripheral integrated chips or devices which perform a variety of functions related to, or necessary for, controlling or monitoring the process. For instance, peripheral device 204 is a communications link or circuitry for receiving and/or transmitting information and instructions over two-wire process control loop 106. Further, while the devices of process control instrument 100 can receive power from a dedicated power supply 214, in some embodiments the nodes of process control instrument 100 receive power over two-wire loop 106 through communication link 204.

Peripheral device 206 can include an integrated chip memory device for storing programming instructions for use by the master or slave nodes, or for storing information indicative of the process conditions. Peripheral device 208 can include an analog-to-digital (A/D) converter for converting information transferred between a device such as sensor 216 and other master or slave nodes. Peripheral device 210 can include a digital-to-analog (D/A) converter for converting digital information or instructions so that they can be used by an analog device such as a valve positioner (controller) 218 which controls the position of valve 108 (FIG. 1) to control the process. Sensor 216 may sense any system or process variable and positioner 218 may be any type of remote device used to control the process, for example. Peripheral device 212 can be a display device, such as a CRT, LED or LCD, for providing graphical or other visual representations of process related information.

Each of the slave nodes in process control instrument 100 preferably includes an interrupt out (INT) pin or connection for generating an interrupt signal, a CS pin or connection for receiving a CS signal, a shift clock (SCK) pin or connection for receiving a synchronous clock signal, a master-out-slave-in (MOSI) pin or connection for receiving serially transmitted data from the master node, a bi-directional master-in-slave-out (MISO) pin or connection for serially transmitting and receiving data, and a slave interrupt input (SLINT) pin or connection for receiving interrupt signals. The bi-directional MISO connection on each slave node is preferably adapted for serially transmitting data from the slave node to a master node or to other slave nodes, and for receiving data transmitted from the MISO connection of other slave nodes. In embodiments of the present invention in which process control instrument 100 does not include a master node or microprocessor, the MOSI connection on the slave nodes can be eliminated.

The master node of process control instrument 100 preferably includes an interrupt SLINT input or connection for receiving interrupt signals, a CS output corresponding to the CS inputs of the slave nodes for generating CS signals, an SCK output corresponding to the SCK input of the slave nodes for generating SCK signals, a MOSI output for transmitting serial data to the MOSI inputs of the slave nodes, and a MISO input for receiving data transmitted from the MISO output connections of the slave node. Optionally, microprocessor 202 (or 200) may include an INT output so that it may operate as a slave node. As shown in FIG. 2, microprocessor 200 is configured as the master node. Therefore, microprocessor 202 does not have CS, MOSI and SCK connections in some preferred embodiments and microprocessor 202 is configured in a monitor mode.

Process control instrument 100 further includes data bus 220 coupled between the various master and slave nodes for facilitating communication between the nodes. As such, data bus 220 includes an INT line coupled to the SLINT connections of each of microprocessors 200 and 202 and to the INT connection of lowest priority slave node 204. The INT and SLINT connections of the remaining slave nodes are daisy chained from the INT output connection of one slave node to the SLINT input connection of the next slave node. The last slave node (i.e. slave node 212 as illustrated) has its SLINT input always tied low or inactive and is the highest priority slave node. The INT output of a slave node is active if that node is generating an interrupt or if its SLINT input is active which indicates that a higher priority slave node is generating an interrupt. This technique alleviates the need for an additional circuits or interconnections for abbitrating interrupts from multiple slave devices.

Data bus 220 also includes a single CS line coupled to the CS output of master node microprocessor 200 and to the CS inputs of each of the slave nodes. The CS signal on the CS data bus line is generated by one of the master nodes and indicates that the data bus is active. It can be used as a delimiter between messages or to indicate which data bus is active if the master node is controlling multiple data buses. Alternatively, it can be permanently tied active or can be eliminated.

Data bus 220 further includes an SCK line coupled to the SCK output of the master node and to the SCK input of each of the slave nodes for transmitting synchronous clock signals between the master and slave nodes. Because of the addressing and other advantages of the data bus protocol of the present invention discussed below, a single CS data bus line can be used, or the CS line can be eliminated altogether. Thus, PCB space can be reduced.

Data bus 220 also includes a MOSI line coupled to the MOSI output connection of the microprocessor and to MOSI input connections of each of the slave nodes for carrying serial data from the microprocessor to the slave nodes. If process control instrument 100 does not include a master node or microprocessor and requires only peer-to-peer communications (i.e., communications between slave nodes), the MOSI line of data bus 220 is not required.

Finally, data bus 220 includes a bi-directional MISO line coupled to the MISO input/output connections of each of the slave nodes and to the MISO inputs of each of the microprocessors for carrying serial data from the slave nodes to the microprocessors and/or for carrying serial data between slave nodes. Note that because the MISO connection on each of the slave nodes is bi-directional, the slave node MISO connections are preferably tri-state devices. In other words, the MISO connections on the slave nodes are in the high impedance state except when a single node has control of the MISO data bus line.

Initially, the slave node with highest interrupt priority has control of the MISO data bus line. The highest priority node that is generating an interrupt and that has an inactive SLINT input has interrupt priority. In FIG. 2, slave node 212 will initially control the MLSO data bus line if it is generating an interrupt at its INT output. Slave node 210 will initially control the MISO data bus line if it is generating an interrupt at its INT output, and if slave node 212 is not. In general, a slave node initially controls the MISO data bus line if it is generating an interrupt, and if all previous nodes in the interrupt daisy chain are not generating an interrupt. Also, control of the MISO data bus line can change as a result of the instruction transmitted on the bus. By making the MISO data bus line bi-directional in the present invention, instead of uni-directional as is the case with standard SPI protocol data bus configurations, peer-to-peer communications between the peripheral devices is possible without increasing the number of data bus lines or physical connections. The above described arbitration method also aids in facilitating bi-directional communications.

If the process control instrument includes a master node, data bus control is typically performed by the master node. If the process control instrument only includes peripheral devices (i.e., slave or peer nodes), the data bus control function can be provided by one of the slave nodes or it can be shared by multiple slave nodes. For example, the slave node with interrupt priority at the beginning of a message can assume the data bus control responsibilities for the message.

Figure 3:
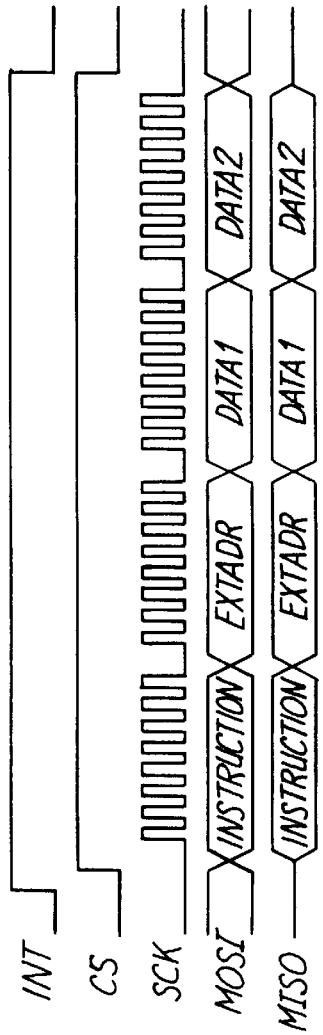
FIG. 3 is a timing diagram illustrating the data bus protocol used in the process control instruments of the present invention.

FIG. 3 is a timing diagram illustrating a message format or protocol used in preferred embodiments of the process control instruments of the present invention. With an interrupt signal (INT) originated by one of the slave nodes (and propagated through the interrupt daisy chain and onto the INT data bus line) and with the CS line held active by a master node, messages on the MOSI or MISO data bus lines are transmitted one bit per each cycle of the SCK signal. As can be seen in the timing diagram of FIG. 3, the first byte of a message on either the MOSI or the MISO data lines is the INSTRUCTION. The second byte is optionally one or more extendable address bytes EXTADR indicative of which node the message is intended for. Potentially, multiple extended address bytes can follow the first extended address byte if needed. These bytes are followed by zero or more data bytes. If one or more address byte extensions are used, bit 5 of the INSTRUCTION byte will be set to logic level 1. If the address is fully contained in the INSTRUCTION byte, bit 5 will be set to 0 and DATA bytes will follow the INSTRUCTION byte. There is no byte count, because the message length is inherent in the INSTRUCTION BYTE.

Figure 4:
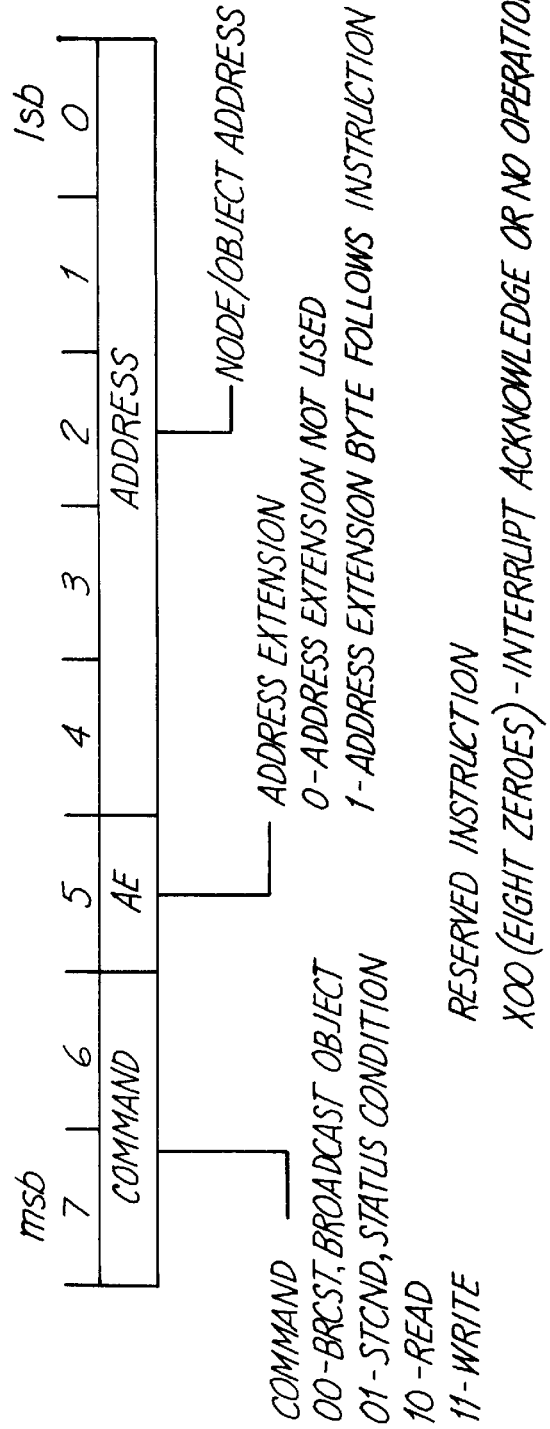
FIG. 4 is a diagrammatic illustration of an instruction byte structure used by the master and slave nodes of the present invention.

The structure of the INSTRUCTION byte of the MOSI or MISO messages illustrated in FIG. 3 is shown in greater detail in FIG. 4. Bits 6 and 7 are indicative of the command, with a 00 representing a broadcast BRCST command, a 01 representing a status condition STCND command, a 10 representing a READ command and a 11 representing a WRITE command. The READ command is a request for the contents of an object in another node, and the WRITE command is a request to change the contents of an object in another node. The broadcast command transmits the value of an object to all nodes and is initiated by the device containing the object. The status command transmits the status condition of a node to all other nodes.

The address extension AE bit (bit 5), if set to a logical 1 value, indicates one or more extended address bytes EXTADR will follow the INSTRUCTION byte before any DATA bytes are transmitted in a message. If the AE bit is set to a logical 1, indicating the next byte is an address, bit 7 of the extended address byte indicates whether yet another extended address byte follows. If bit 7 of the extended address byte is set to a logical 1, then the next byte of the transmitted message will also be an extended address byte. If bit 7 of the extended address byte is set to a logical 0, the next byte of the message will be a DATA byte. In this manner, address lengths of any number of bytes can be used without modifying the data bus, the components or the programming. This feature of the present invention increases the ease in which nodes can be added or interchanged. Bits 0–4 of the INSTRUCTION byte are the node/object address. The instruction 00 hex (8 zeros) is reserved and is defined as an interrupt acknowledge or a no operation indicator.

Various embodiments of the present invention include one of three address assignment mechanisms for assigning addresses to the nodes for subsequent communication on the data bus. The three address assignment mechanisms are referred to in this application as static address assignment, master dynamic address assignment and automatic peer address assignment, respectively. Any of the address assignment methods can be used, and slave nodes using any of the three methods can be mixed on the data bus. However, in all cases the nodes must either know in advance the address assignments, or each node must broadcast its address at start-up. It may be desirable for each of the nodes in the process control instrument to transmit its respective address, whether static or dynamic in nature, along with an identifier indicating what type of node it is, to all of the other nodes in the process control instrument at start-up.

In the static address assignment method, each node has an external hard-wired address. INSTRUCTION bytes containing the address corresponding to a particular node result in the node receiving the corresponding message. A node can have multiple independently addressable objects. If more than five bits are required to address all of the objects and nodes, extended address bytes can be used as discussed above. The address and extended address states can be divided between the node addresses and object addresses as required.

Both of the master dynamic and automatic peer address assignment mechanisms are dynamic in nature, which provides an advantage in that the process control instrument nodes can be upgraded and interchanged without physically reassigning addresses or changing the system software. In the master dynamic address assignment method, at reset all slave nodes/objects on the bus are initialized at address zero, and all slave nodes generate an interrupt. A master node or microprocessor will then assign a non-zero address to each node/object in order from the highest priority node/object to the lowest priority node/object. Generally, the master node will generate the non-zero addresses and transmit the respective addresses over the data bus to the assigned nodes. For example, the initial interrupt acknowledge from the master node can have the address, included in a data field of the message, which is assigned to the node with the highest priority. As each node/object is assigned an address, it removes its interrupt request. This must be done before any other operations are carried out on the data bus. This feature provides easy interchangeability of various modules of the field instrument such as the addition or replacement of a sensor module.

In the automatic peer address assignment method, the slave node which initially has interrupt authority assigns itself the first address. The node with the highest interrupt priority which has assigned itself the first address then uses a broadcast BRCST command in the message INSTRUCTION byte to notify all of the other nodes that the first address has been assigned. The next node without an address, and with the next highest interrupt priority, then assigns itself the second address. Subsequently, it broadcasts a message which notifies all other nodes that the second address has been assigned. In general, the node with the highest interrupt priority and without an address assigns itself the next sequential address, and then broadcasts to the other nodes the fact that the new address has been assigned. As stored in slave node 206 or in other memory, a record of the last used address can be initialized to zero at start-up.

In preferred embodiments of the process control instrument of the present invention, any node can read a message from or write a message to any object (i.e. memory location, peripheral, etc.) of any node by issuing a READ or WRITE command message within the objects address indicated in the INSTRUCTION byte and any extended address bytes. Also, any node can indicate that a status condition exists by issuing a STCND command, with the address field of the INSTRUCTION byte indicating the object with the status condition and, optionally, with a data byte of the message containing the object value. Status conditions can include data ready, data overflow, data buffer empty, or hardware and software faults. A node can also broadcast the value of an object with a message having a BRCST command and object address in the INSTRUCTION byte, followed by the object value in a data byte of the message.

A master node or microprocessor sends commands to the slave nodes using the MOSI line of the data bus. Slave nodes send commands to both master and other slave nodes on the bi-directional MISO line of the data bus. Thus, slave nodes can receive commands and information on both the MOSI and the MISO lines of the data bus. The MISO line of the data bus will be pulled low by an active pull down by any one of the slave nodes. If a slave node needs to initiate communications on the data bus, it generates an interrupt on its INT pin or connection. If none of the slave nodes are generating an interrupt, all of the MISO output connections of the slave nodes will be in the high impedance state, indicating no messages are being sent from the slave nodes.

The master node can transmit on the data bus under at least two conditions. First, the master node can transmit messages on the data bus in response to an interrupt signal from a slave node. Second, the master node can transmit messages at its own discretion. When a slave node generates an interrupt, the master node will issue a command on the MOSI line of the data bus in response. As the master node is transmitting the response message on the MOSI line of the data bus, the highest priority interrupting slave node can transmit its message on the MISO line of the data bus. If the master node's response message contains an interrupt acknowledge, the interrupting node can continue to transmit its message on the MISO line of data bus. If the master node's response message on the MOSI line of the data bus is a command other than an interrupt acknowledge, the message from the slave node is aborted until the next message sequence.

In embodiments of the present invention in which the process control instrument does not include a master node, the MOSI data bus line can be eliminated or tied inactive (i.e., tied to a low logic level state), and all messages will treated as if they contain an interrupt acknowledge. In this case, the SCK signal must be generated by a device or node other than a master node. Further, if required at all, the CS signal on the CS data bus line would also have to be generated by another device if no master node is present.

The present invention provides numerous other advantages over process control instruments having master nodes operating in accordance with the standard SPI protocol and using a standard data bus configuration. One advantageous feature of some preferred embodiments of the present invention is that slave nodes can receive messages on the MISO data bus line from peer slave nodes. The physical layer communications are transformed into a communications data bus scheme capable of master and/or slave node broadcast type communications, master-to-slave type communications slave-to-master type communications, and peer-to-peer slave node communications. Using the modified data bus features and physical connections, master nodes using the standard SPI protocol can address multiple slave nodes with a single CS data bus line. If all nodes on the data bus use this modified protocol, the CS line can be considered always active and therefore can be fully eliminated.

The present invention also includes an arbitration technique which uses physical interconnect and/or instruction interpretation to determine which of multiple slave nodes has priority and thus control of the data bus. Further, the dynamic addressing techniques used in the improved process control instrument of the present invention allow the nodes to be easily interchanged or substituted and allows the software to be more independent of the hardware configuration. Also, the bi-directional MISO data bus line of the present invention provides peer-to-peer communications between slave nodes. In process control instruments which use peer-to-peer communications exclusively, the MOSI data bus line can be eliminated all together. Other benefits of the enhanced SPI protocol and data bus configuration of the present invention include reduced integrated chip pin counts and PCB interconnections which lead to a reduction in cost and physical size, the ability to use existing microprocessors which operate on standard SPI protocol, and the fact that microprocessor loading can be reduced via the availability of broadcast and peer-to-peer communications capabilities so that communication between slave nodes does not have to be routed through the microprocessor.

Although the present invention has been described with reference to preferred embodiments, workers skilled in the art will recognize that changes may be made in form and detail without departing from the spirit and scope of the invention. It will be understood that the present invention may be implemented in any type of process control instrument. Further, various functional blocks may be implemented using any appropriate hardware, software, or firmware technique or their combination. Other minor design changes are also possible. For example, in embodiments in which microprocessor 200 acts as the master node, communication by a second microprocessor (i.e., microprocessor 202) can be implemented in several ways. The additional microprocessor can be treated as a peripheral device, in which case it would include a INT output and would be daisy chained with the other slave nodes. Then, the additional microprocessor would communicate over the bi-directional MISO line. In the alternative, tri-state drivers can be added to the MOSI output of each microprocessor and all microprocessors can transmit over the MOSI line.

What is claimed is:

1. A process control instrument comprising:
   a microprocessor operating in accordance with the SPI data bus protocol;
   a first peripheral device;
   a second peripheral device; and
   a data bus coupled to the microprocessor, to the first peripheral device, and to the second peripheral device, wherein the data bus includes a single chip select line coupled to chip select connections on each of the microprocessor, the first peripheral device and the second peripheral device, and wherein the data bus further includes a bi-directional master-in-slave-out (MISO) line coupled to the microprocessor, the first peripheral device and the second peripheral device.

2. The process control instrument of claim 1, wherein the microprocessor generates a signal on the single chip select line of the data bus to notify the first and second peripheral devices that the data bus is active.

3. The process control instrument of claim 1, wherein the first peripheral device transmits messages to the second peripheral device on the bi-directional MISO line.

4. The process control instrument of claim 1, and further comprising means for dynamically assigning addresses to the first and second peripheral devices for use in communicating on the data bus.

5. A process control instrument comprising:
   a microprocessor operating in accordance with the SPI protocol;
   a first peripheral device;
   a second peripheral device; and
   a data bus coupled to the microprocessor, to the first peripheral device and to the second peripheral device, wherein the data bus includes a bi-directional Master-In-Slave-Out (MISO) line coupled to MISO connections on each of the microprocessor, the first peripheral device and the second peripheral device.

6. The process control instrument of claim 5, wherein the bi-directional MISO line is adapted to carry serial data both from the first and second peripheral devices to the microprocessor, and between the first and second peripheral devices.

7. The process control instrument of claim 6 and further comprising a third peripheral device having a MISO connection coupled to the bi-directional MISO line of the data bus, wherein the first peripheral device broadcasts messages to both of the second and third peripheral devices simultaneously over the bi-directional MISO line.

8. The process control instrument of claim 6 and further comprising means for dynamically assigning addresses to each of the first and second peripheral devices for use in receiving messages over the data bus.

9. The process control instrument of claim 8, wherein each of the first and second peripheral devices has a priority associated therewith, wherein the one of the first and second peripheral devices having a higher priority assigns itself a first address and subsequently broadcasts the first address over the bi-directional MISO line to the microprocessor and to the other of the first and second peripheral devices having a lower priority.

10. The process control instrument of claim 9, wherein after the one of the first and second peripheral devices broadcasts the first address, the other of the first and second peripheral devices assigns itself a second address and subsequently broadcasts the second address over the bi-directional MISO line to the microprocessor and to the one of the first and second peripheral devices.

11. The process control instrument of claim 8, wherein each of the first and second peripheral devices includes interrupt generating circuits for generating interrupts, wherein the means for dynamically assigning addresses comprises:
   an interrupt detection circuit associated with the microprocessor for detecting a first interrupt generated by one of the first and second peripheral devices on the data bus;
   an address generating circuit associated with the microprocessor for generating a first address; and
   an address transmitting circuit associated with the microprocessor for transmitting over the data bus the first address to the one of the first and second peripheral devices which generated the first interrupt and thereby assigning the first address to the one of the first and second peripheral devices which generated the first interrupt.

12. The process control instrument of claim 6, wherein the data bus includes a single chip select line coupled to chip select connections on each of the microprocessor, the first peripheral device and the second peripheral device.

13. A process control instrument, comprising:
   a first slave node;
   a second slave node; and
   a master node, wherein the master node is coupled to the first and second slave nodes by a data bus, wherein the master node comprises:
      an interrupt detection circuit for detecting a first interrupt generated by one of the first and second slave nodes on the data bus;
      an address generating circuit for generating a first address in response to the first interrupt generated by the one of the first and second slave nodes; and
      an address transmitting circuit for transmitting over the data bus the first address to the one of the first and second slave nodes which generated the first interrupt and thereby assigning the first address to the one of the first and second slave nodes which generated the first interrupt.

14. The process control instrument of claim 13, wherein the master node further comprises:
   an interrupt detection circuit for detecting a second interrupt generated by the other of the first and second slave nodes on the data bus;
   an address generating circuit for generating a second address in response to the second interrupt generated by the other of the first and second slave nodes; and
   an address transmitting circuit for transmitting over the data bus the second address to the other of the first and second slave nodes which generated the second interrupt and thereby assigning the second address to the other of the first and second slave nodes which generated the second interrupt.

15. A system comprising:
   a microprocessor operating in accordance with the SPI protocol;

a first peripheral device;

a second peripheral device;

a data bus coupled to the microprocessor, to the first peripheral device and to the second peripheral device; and means for dynamically assigning addresses to each of the first and second peripheral devices for use in receiving messages over the data bus, wherein the means for dynamically assigning addresses is coupled to the data bus, wherein each of the first and second peripheral devices has a priority associated therewith, wherein the means for dynamically assigning addresses includes means for the one of the first and second peripheral devices having a higher priority to assign itself a first address and subsequently broadcast the first address over the data bus to the microprocessor and to the other of the first and second peripheral devices having a lower priority.

16. A method of communicating on a data bus in a process control instrument, comprising:

generating a chip select signal on a single chip select line of the data bus coupled to chip select inputs of each of first and second peripheral devices, wherein the chip select signal is generated by a microprocessor operating in accordance with the SPI data bus protocol to indicate that the data bus is active; and transmitting data from one of the first and second peripheral devices to the other of the first and second peripheral devices over a master-in-slave-out (MISO) line of the data bus while the chip select signal is generated on the single chip select line coupled to chip select inputs of each of first and second peripheral devices.

17. A method of communicating on a data bus between first and second peripheral devices in a process control instrument, the method comprising:

transmitting data from a bi-directional master-in-slave-out (MISO) connection on the first peripheral device over a bi-directional MISO line on the data bus; and receiving the data transmitted from the bi-directional MISO connection on the first peripheral device at a bi-directional MISO connection on the second peripheral device.

* * * * *